United States Patent [19]

Bowen et al.

[11] Patent Number: 5,486,979
[45] Date of Patent: Jan. 23, 1996

[54] ELECTRICITY SUPPLY ASSEMBLY

[75] Inventors: Peter W. Bowen, Sutton Coldfield; Darren J. Shotter, Handsacre, both of England

[73] Assignee: Crabtree Electrical Industries Limited, Walsall, United Kingdom

[21] Appl. No.: 196,174

[22] PCT Filed: Feb. 12, 1992

[86] PCT No.: PCT/GB92/00254

§ 371 Date: Feb. 16, 1994

§ 102(e) Date: Feb. 16, 1994

[87] PCT Pub. No.: WO93/04514

PCT Pub. Date: Mar. 4, 1993

[30] Foreign Application Priority Data

Aug. 21, 1991 [EP] European Pat. Off. ............. 91307670

[51] Int. Cl.$^6$ ............................................. H02B 1/04
[52] U.S. Cl. ........................... 361/640; 200/296; 361/675; 439/188; 439/572
[58] Field of Search ..................... 200/293, 294, 200/297, 51 R, 296; 248/27.1, 310, 906, 220.2, 223.3, 225.1, 225.2, 221.3; 211/26; 174/68.2, 70–72 B, 99 B, 88 B; 439/188, 460, 571, 572, 573–575; 361/634, 627, 673, 636, 637, 639, 640, 650, 807, 809, 810, 823, 825, 675

[56] References Cited

U.S. PATENT DOCUMENTS

| | | | |
|---|---|---|---|
| 2,231,056 | 2/1941 | De Mask | 361/675 |
| 3,155,882 | 11/1964 | Casey | 361/656 |
| 4,388,535 | 6/1983 | Wiktor | 307/113 |
| 4,646,199 | 2/1987 | M'Sadoques | 361/353 |
| 4,989,118 | 1/1991 | Sorenson | 361/376 |
| 5,047,604 | 9/1991 | Grass | 200/294 |
| 5,094,626 | 3/1992 | Fabrizi | 439/511 |
| 5,117,330 | 5/1992 | Miazga | 361/400 |
| 5,172,300 | 12/1992 | Morley | 361/355 |

FOREIGN PATENT DOCUMENTS

| | | | |
|---|---|---|---|
| 0109881 | 5/1984 | European Pat. Off. | |
| 7309133 | 6/1973 | Germany . | |
| 1102914 | 2/1968 | United Kingdom | 361/634 |
| 2036437 | 10/1978 | United Kingdom . | |
| 2034984 | 6/1980 | United Kingdom | 361/637 |

Primary Examiner—Gerald P. Tolin
Attorney, Agent, or Firm—R. Neil Sudol; Henry D. Coleman

[57] ABSTRACT

An electricity supply assembly comprises a circuit breaker comprising a housing (2) having generally flat, parallel side faces provided on the underside with a mounting recess (4), for mounting on a mounting rail of the conventional "top hat" section, comprising a base (7), spaced parallel flanges (8) extending from the base, and parallel outwardly extending flanges (9) which together provide a support surface which may be engaged by an underside of the recess (4). Extending from the underside of the circuit breaker at right angles to the plane of the base is a contact member (22). A supply assembly (28) comprises an elongate housing (30) within which an elongate bus-bar (32) is located, the bus-bar being provided with spaced intervals with spring clips (34). The housing (30) comprises a cover (36), provided at spaced intervals, corresponding to the spacing between the spring clips (34), with apertures (38). A supporting assembly comprises end housings (150), onto which the ends of the mounting rail are press-fitted, the housing also providing a support for the supply assembly, so that the supply assembly extends alongside, and generally below the mounting rail. In the use of the invention, a circuit breaker may be mounted on the mounting rail, the contact member (22) thereof passing through one of the apertures (38) of the housing (30) into engagement with the bus-bar (32) being pressed into face-to-face contact therewith by one of the spring clips (34).

12 Claims, 7 Drawing Sheets

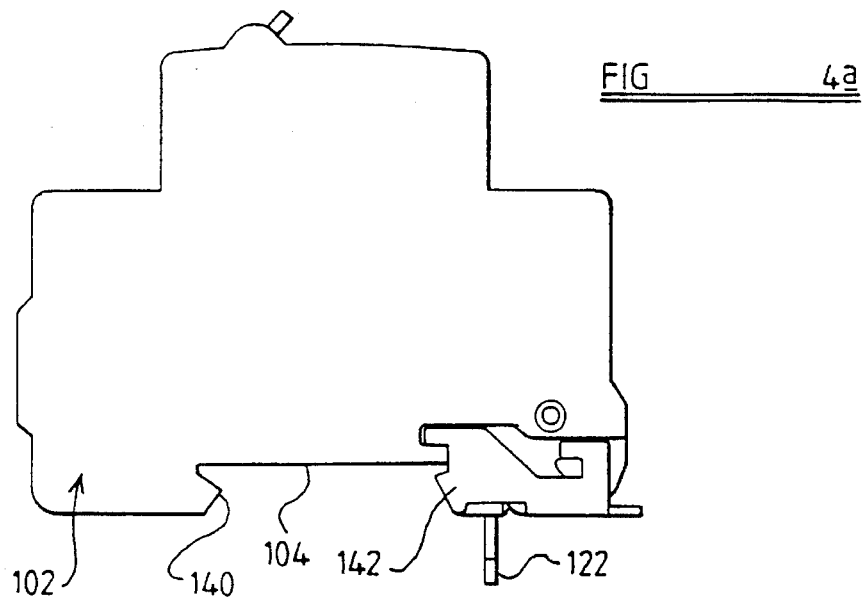
FIG 4a
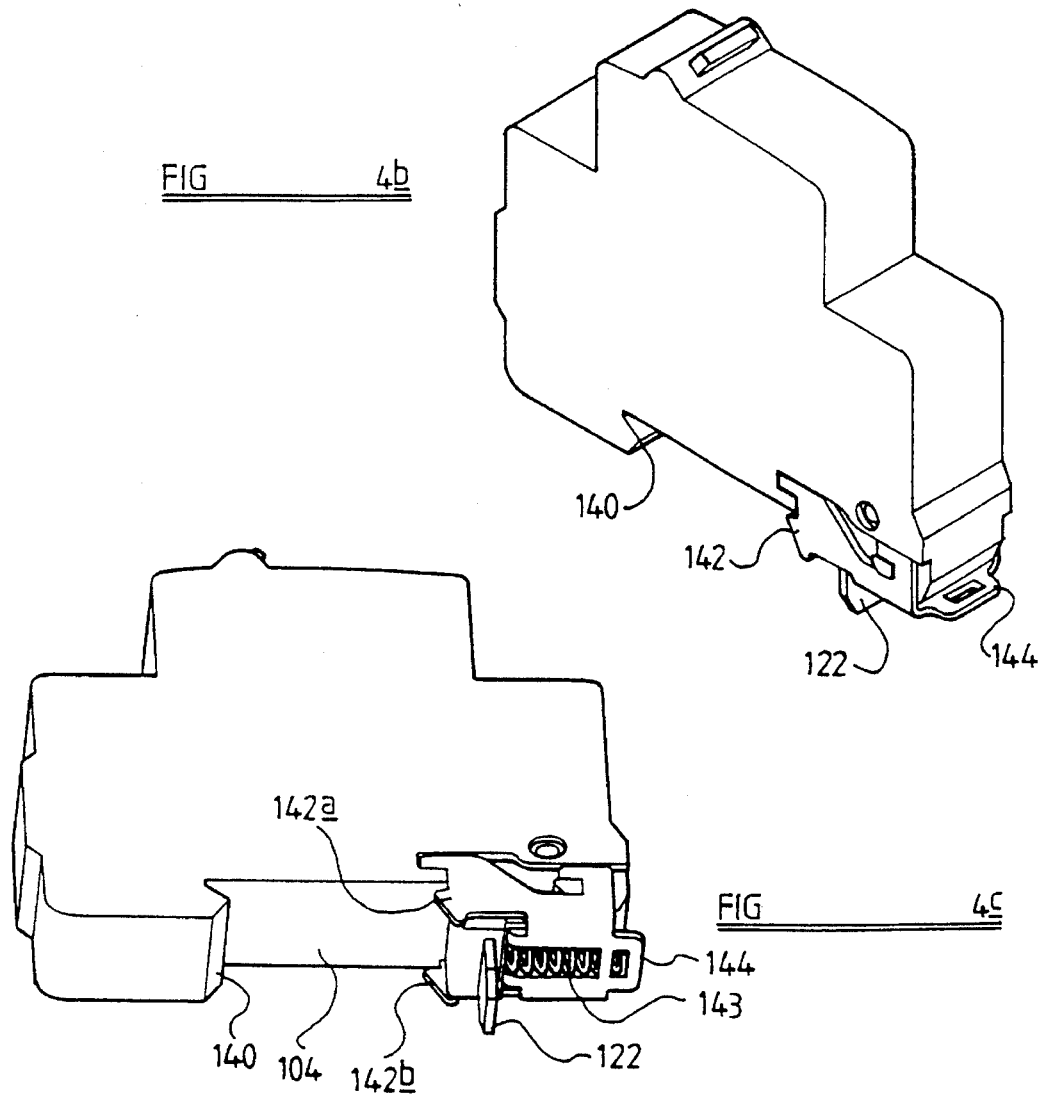
FIG 4b
FIG 4c

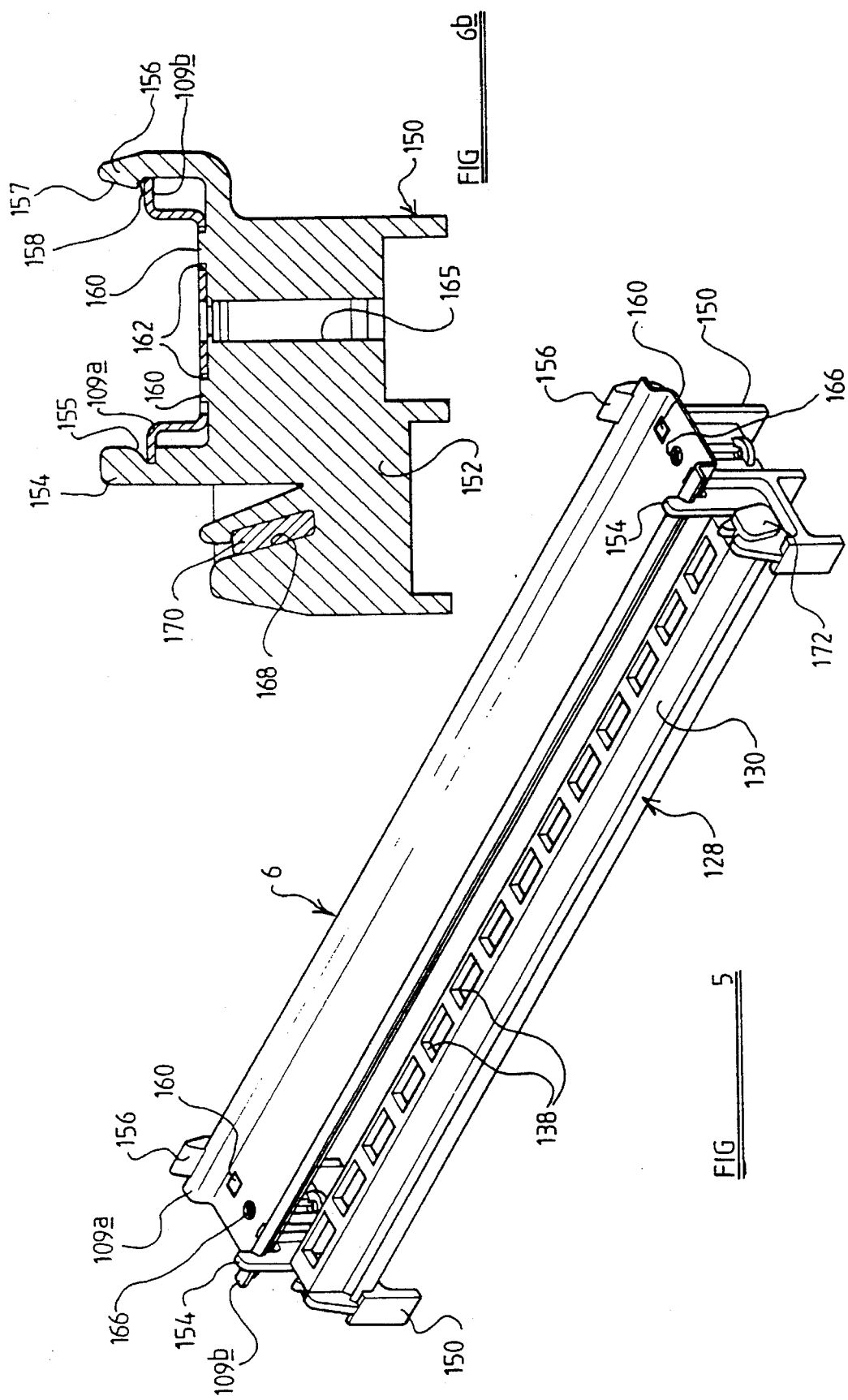

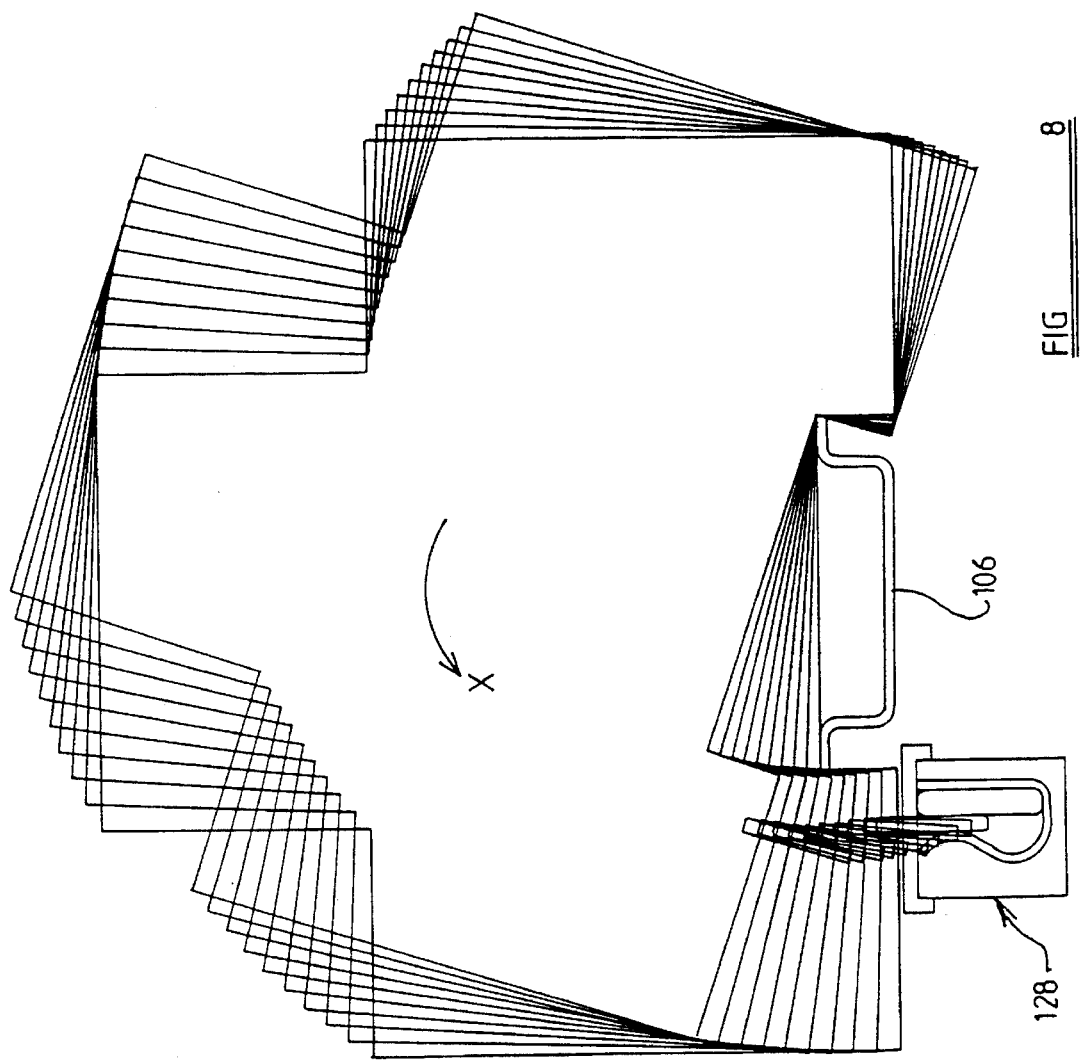

ELECTRICITY SUPPLY ASSEMBLY

DESCRIPTION OF THE INVENTION

This invention is concerned with improvements relating to the mounting of circuit breakers.

A conventional circuit breaker, hereinafter referred to as being of the kind specified, comprises a generally flat, parallel-sided body provided on the underside thereof with a mounting recess which in use is positioned over and engaged with a mounting rail, with a primary plane of the circuit breaker, extending parallel to the flat sides, extending at right angles to the length of the mounting rail.

A conventionally used mounting rail is termed a "din-rail", being of inverted top hat cross-section, comprising parallel upwardly-facing flanges and narrow outwardly-turned lips.

Conventionally the circuit breaker is provided on the underside thereof with an inwardly-turned lip, providing a fixed retaining formation having a re-entrant surface, an opposite side edge portion of the recess being bounded by straight edges. The circuit breaker comprises a catch assembly, resiliently urged from a retracted position to an advanced position, in which advanced position a retaining element of the catch assembly projects through of one said straight edge a short distance into the recess.

In use, the circuit breaker is engaged with the mounting rail, the retaining formation being engaged beneath one of the lips with the underside of the circuit breaker inclined relative to the mounting rail, and the circuit breaker is moved angularly so as to cause the retaining element to engage the other lip, the profile of the retaining element causing it to be momentarily depressed against the resilient force urging it to its advanced position, as it passes behind the other lip. The circuit breaker is then clamped in conventional manner to a bus-bar, supported in parallel relationship to the mounting rail, with the flat faces of the circuit breaker lying against the flat faces of adjacent circuit breakers.

When it is required to move one circuit breaker from an array of circuit breakers on the rail, the retaining element is manually retracted, and held retracted, and the circuit breaker is tilted within said primary plane to permit movement of the circuit breaker relative to the rail to disengage the fixed retaining formation from the rail. This necessitates a temporary removal of the bus-bar, and this is inconvenient since it involves disruption of the connections of other circuit breakers and/or of other electrical equipment used in relation to the bus-bar.

Numerous suggestions have been made for the provision of a more convenient mounting of circuit breakers of the kind specified to the mounting rail, to enable them to be removed and replaced with minimal disruption. However heretofore all other suggestions have been unsatisfactory in one aspect or other, and/or unduly expensive.

According to this invention there is provided, in combination for use with a mounting rail providing a flat surface against which a circuit breaker may be located, a circuit breaker and a supply assembly comprising a supply member for the supply of electricity to circuit breakers mounted on the mounting rail, wherein:

the circuit breaker comprises a recess which may be located over the mounting rail; and the supply member provides a contact surface and the supply assembly comprises means to urge a contact member of the circuit breaker against said contact surface, the contact member projecting from an underside of the circuit breaker.

Thus the circuit breaker may be mounted in position by being placed with the recess against the mounting rail and the contact member engaged with the supply member, conveniently such engagement being a surface-to-surface engagement, said means conveniently being afforded by spring means.

Electrical components other than-circuit breakers, including main switches, transformers. RCDs, which need the supply of electric current from the supply member, may of course be mounted on the mounting rail in the same manner as the circuit breakers, being connected to the supply member in a similar manner.

Preferably the supply member extends alongside the mounting rail at a position such as to enable other electrical components, which do not need to be connected to the supply member, to be mounted on the mounting rail in the same manner as the circuit breakers, without any interference from the supply member.

In this manner the circuit breaker may derive a significant degree of stability substantially wholly from engagement with the flat surface of the mounting rail and engagement with the bus-bar.

Thus the circuit breaker need not be provided with the conventional spring clip engageable with the underside of the mounting rail, and the disadvantages thereof may be obviated.

The mounting rail may be of the conventional inverted "top hat" section, which may be secured to a conventional supporting assembly, or may be of other convenient shape. Thus the surface provided for engagement and support of the circuit breaker may be provided by spaced, parallel extending surfaces.

The circuit breaker may be removed by rectilinear movement in a direction at right angles to the plane of the surface of the mounting rail away therefrom, simultaneously withdrawing the contact member from its engagement with the bus-bar.

However if desired the circuit breaker may comprise a conventional formation, to engage beneath the mounting rail, to provide for greater stability of the circuit breaker on the mounting rail. Such a formation may be provided on the side of the circuit breaker opposite to that on which the contact member is provided, enabling the circuit breaker to be disengaged by initial rotational movement of the circuit breaker to withdraw the contact member from engagement with the bus-bar, followed by translational movement. It will be appreciated that such movement may be effected without disturbance to adjacent components which may be mounted on the rail, and without disturbance to the bus-bar itself.

Alternatively or in addition the circuit breaker may comprise a formation on the same side thereof as the contact member, which is spring urged to engage-beneath the mounting rail, such formation conveniently retracting automatically on movement of the circuit breaker against the mounting rail, allowing the circuit breaker to be "clicked" in position.

Thus preferably the body of the circuit breaker is flat, parallel-sided, and when the mounting recess is positioned over and engaged with the mounting rail, a primary plane of the circuit breaker, extending parallel to the flat sides, extends at right angles to the length of the mounting rail.

Preferably the contact member extends beyond said plane of the mounting recess, for engagement with the supply member. Preferably the contact member comprises a flat contact surface lying in a plane which extends at right angles to the primary plane of the circuit breaker, and which may thus engage face-to-face with the bus-bar.

The supply assembly may comprise an elongate, insulated housing within which the bus-bar is located, apertures being provided at spaced intervals in the housing for reception of the contact members of a plurality of such circuit breakers or other electrical equipment, to shield the bus-bar to provide for added safety, particularly where the aperture is sufficiently small to prevent finger entry, as provided for by BS 3042—Standard Test Fingers and Probe.

Additionally the length of the terminal portion may in relation to the size of the bus-bar and the depth of the housing be such as to ensure that, as the terminal portion is withdrawn from the aperture, and becomes available to be touched, it moves out of contact with the bus-bar.

Preferably the housing comprises a plurality of spring clips at spaced locations such that at least one spring clip is available to engage the contact member as it is moved towards the bus-bar. Where spaced apertures are provided for reception of the contact members, conveniently a spring clip is located in relation to each such aperture.

Preferably each spring clip is provided with an entrant portion which is open for reception of the contact member between said entrant portion and the bus-bar, to enable the spring clip to be opened in consequence of the insertion of the contact member into position.

Preferably the combination set out in the last preceding paragraph also comprises a supporting assembly comprising two end housings each comprising an engagement surface, against which the underside of a mounting rail may be engaged, and spaced arms extending from said engagement surface, at least one of said arms comprising location means to enable one of the outwardly-turned lips of the mounting rail to be engaged therein, and at least one of the arms being resilient to allow the mounting rail to be snap-fitted into position against said engagement surface and between said arms.

In this manner, by mounting a mounting rail on two such housings, one at each of the end regions of the mounting rail, a free-standing assembly may be provided, comprising a mounting rail upon which, between the end housings, circuit breakers may be mounted.

Preferably the engagement surfaces of the housings are provided with formations (such as male and/or female formations) which may be engaged with complementary formations on the underside of the mounting rail, to provide stability.

Preferably the housings are provided with means for supporting the supply assembly in parallel relationship with the mounting rail. Thus, where the supply assembly comprises an elongate housing, a bus-bar located in and extending lengthwise of the housing, one or more opening being provided in the housing to enable the contact members of the circuit breakers to be engaged with the bus-bar, and spring means to urge such contact members into engagement with the bus-bar, preferably the elongate housing is provided with supporting members to support the ends of the bus-bar, the end housings being cooperable with the supporting members whereby the bus-bar may be secured stably to, extend between, the end housings.

Preferably such cooperation is effected by the provision of snap-fitting means of the end housings, into which parts of the supporting members may be secured, although this may if desired be reversed.

Preferably the combination set out in the last preceding paragraph comprises a supply switch, which may be mounted on the mounting rail in the same manner as has been described in relation to the circuit breakers, and which comprises a contact member for engagement with the bus-bar, the supply switch being adapted to supply electric current to the bus-bar.

According to this invention there is also provided a circuit breaker of the kind comprising flat, parallel side faces and a recess in an underside face thereof to be engaged with a mounting rail, characterised in that the circuit breaker comprises a contact member projecting through and from an underside face thereof.

Preferably the construction and arrangement is such that, when the mounting recess is positioned over and engaged with the mounting rail, a primary plane of the circuit breaker, extending parallel to the flat sides, extends at right angles to the length of the mounting rail.

Preferably the contact member extends beyond said plane of the mounting recess, for engagement with a supply member extending parallel to, and spaced from the mounting rail. Preferably the contact member comprises a flat contact surface lying in a plane which extends at right angles to the primary plane of the circuit breaker, for face-to-face engagement with the supply member.

According to this invention there is also provided a supply assembly for a plurality of circuit breakers of the kind specified, said assembly comprising an elongate insulated housing, an elongate bus-bar within the housing, the bus-bar providing a surface against which a contact member may be engaged, at least one opening in the housing for passage of the contact member of circuit breakers into the housing for engagement with the bus-bar, and means to urge such contact members into face-to-face contact with the bus-bar.

Preferably the housing is provided with a plurality of openings, each capable of receiving the contact member of a circuit breaker or other items of electrical installation equipment and preferably said means to urge the contact members into face-to-face contact with the bus-bar is provided by spring clips.

According to this invention there is also provided a supporting assembly for a mounting rail comprising a base, parallel upwardly-facing flanges, and narrow outwardly-turned lips, the supporting assembly comprising two end housings each comprising a engagement surface, against which the underside of the base of the mounting rail may be engaged, and spaced arms extending from said engagement surface, at least one of said arms comprising location means to enable one of the outwardly-turned lips to be engaged therewith, and at least one of the arms being resilient to enable the mounting rail to be snap-fitted into position against said engagement surface and between said arms.

In this manner, by mounting a mounting rail on two such housings, one at each of the end regions of the mounting rail, a free-standing assembly may be provided, comprising a mounting rail upon which, between the end housings, circuit breakers may be mounted.

Preferably the engagement surfaces of the housings are provided with formations (such as male and/or female formations) which may be engaged with complementary female and/or male formations of the base of the mounting rail, to improve stability.

Preferably the end housings are provided with means to enable them to be secured to a supporting surface, such as apertures whereby the housings may be screwed to a supporting surface. If desired the mounting rail may be provided with apertures whereby such screws pass through both the mounting rail and the end housing subsequent to the assembly of the mounting rail on the end housings.

Preferably the housings are provided with means for supporting a supply assembly, comprising a bus-bar, in parallel relationship to the mounting rail, preferably in a manner in which stability of the assembly is improved.

Thus preferably the supply assembly comprises a bus-bar, and is provided with means whereby circuit breakers may be electrically connected therewith, and supporting members, conveniently at the end portions thereof, the end housings being cooperative with the supporting members whereby the bus-bar may be secured stably to, to extend between, the end housings.

Preferably such cooperation is effected by the position of snap-fitting means on the end housing, into which parts of the supporting member may be secured, although if desired this may be reversed.

There will now be given a detailed description, to be read with reference to the accompanying drawings, of preferred embodiments of this invention, which have been selected for the purposes of illustrating the invention by way of example.

In the accompanying drawings:

FIGS. 4a, 4b and 4c are outline views showing the circuit breaker of the second embodiment in different orientations;

FIG. 5 is a perspective view of a supporting assembly of the second embodiment;

FIGS. 6a and 6b are end elevations of said supporting assembly, illustrating a movement into operative positions thereon of a mounting rail;

FIG. 8 is a schematic view showing the mounting of the circuit breaker on the mounting rail of the second embodiment, and engaging with the supply assembly.

Figure 1:
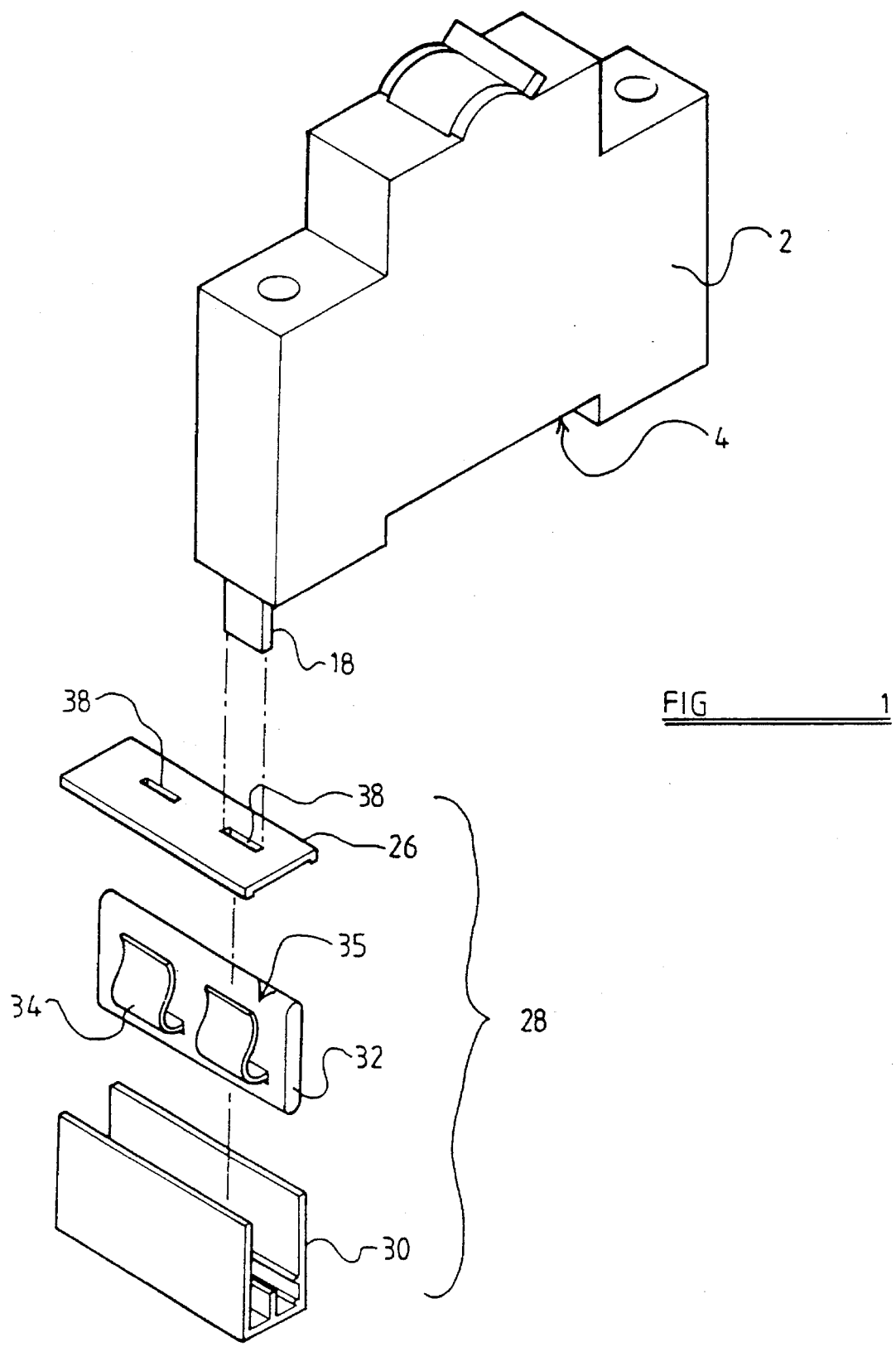
FIG. 1 is an exploded view of an assembly of circuit breaker and supply assembly in accordance with a first embodiment of the invention.
Figure 2:
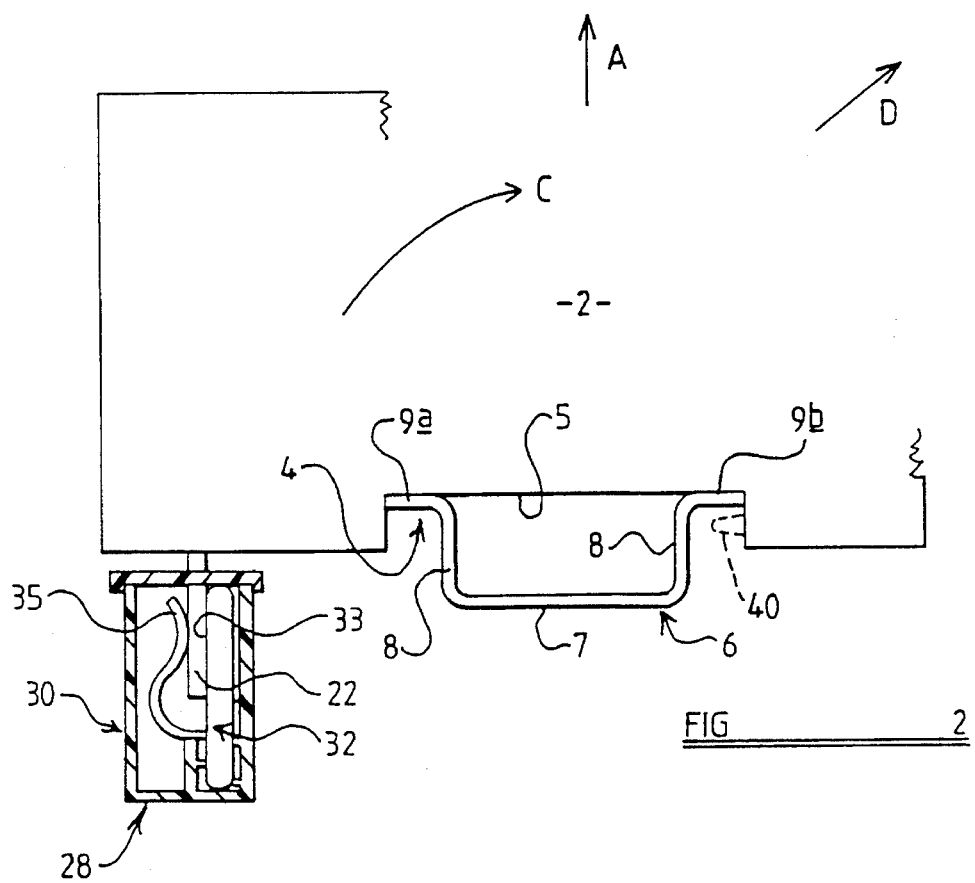
FIG. 2 is a schematic sectional view showing the circuit breaker mounted on a mounting rail, and connected with the supply assembly.

The circuit breaker of the first embodiment is generally conventional, comprising a housing 2 having generally flat, parallel side faces and provided on the underside thereof with a mounting recess 4, for mounting on a mounting rail 6 of conventional "top hat" section, and of the kind conventionally referred to as "din rail", the rail comprising a base 7, spaced, parallel flanges 8 extending from the base, and parallel outwardly extending flanges 9a and 9b which together provides a support surface which may be engaged by an underside of the recess 4, (see FIG. 2).

In use, a plurality of circuit breakers are mounted on the mounting rail 6 with the side faces thereof in generally abutting relationship, with a primary plane of each circuit breaker, extending parallel to the flat sides thereof, extending at right angles to the length of the mounting rail.

Extending downwardly from the circuit breaker in a direction extending at right angles to the plane of engagement between the recess 4 of the circuit breaker and the flanges 9a, 9b, of the mounting rail is a contact member 22, said contact member being in electrical contact with the switch mechanism of the circuit breaker and having a terminal portion 18 in the form of a flat blade.

The circuit breaker is for use with a supply assembly 28 comprising an elongate housing 30 within which an elongate bus-bar 32 is located, the bus-bar being provided at spaced intervals with spring clips 34, each spring clip being provided at an upper end portion thereof with an outwardly-flared entrant portion 35. The bus-bar is located within the housing, which comprises a cover 36, provided at spaced intervals, corresponding to the spacing between the spring clips 34, with apertures 38.

The bus-bar 32 is preferably provided with a flat contact face 33, extending in the longitudinal direction parallel to the length of the mounting rail 6, and at right angles to the primary planes of the circuit breakers when mounted thereon, to be engaged by the flat face of the terminal portion 18 of each contact member 22

In use, the circuit breaker is moved towards the mounting rail 6, with the underside 5 of the recess 4 engaging the surfaces 9a, 9b provided by the out-turned flanges and the terminal portion 18 passes through one of the apertures 38 AND engages the opening portion 35 of the spring clip 34 as it moves into contact with the bus-bar 32, the spring clip thereafter retaining the terminal portion 18 in face-to-face contact with the bus-bar.

With this construction circuit breaker may be removed from the mounting rail and supply assembly 30 by simple linear movement in the direction of the arrow A, minimising disruption of the bus-bar and other components which may be mounted on the bus-bar.

However if greater stability is required, a projection may be provided on the right hand side of the housing, as shown in dotted lines and indicated by the numeral 40 in FIG. 2, which is engageable beneath the right hand flange 9b_, to provide greater stability. In such circumstances the circuit breaker may be removed from the mounting rail and bus-bar assembly initially by rotational motion in a clockwise direction, until the terminal portion 18 passes from the aperture 38 of the housing, subsequent to which translational movement in the general direction D may be effected to complete removal of the circuit breaker from the din-rail.

In the second embodiment, in which for the circuit breaker similar numerals increased by 100 have been used to denote parts similar to those of the first embodiment, in addition to having a fixed projection 140, the circuit breaker is provided with a retractable projection 142 extending into the recess 104 from the opposite side, said projection 142 being urged by a spring 143 to its advanced position, and being retractable by engagement of a tail 144, by a tool such as a screw driver. Preferably, as is shown in FIG. 4c, the projection 142 is provided by spaced flanges 142a, 142b serving together as the retractable projection. In this manner, the contact member 122 may be arranged so as to project between said flanges 142a, 142b without contact.

Figure 6A:
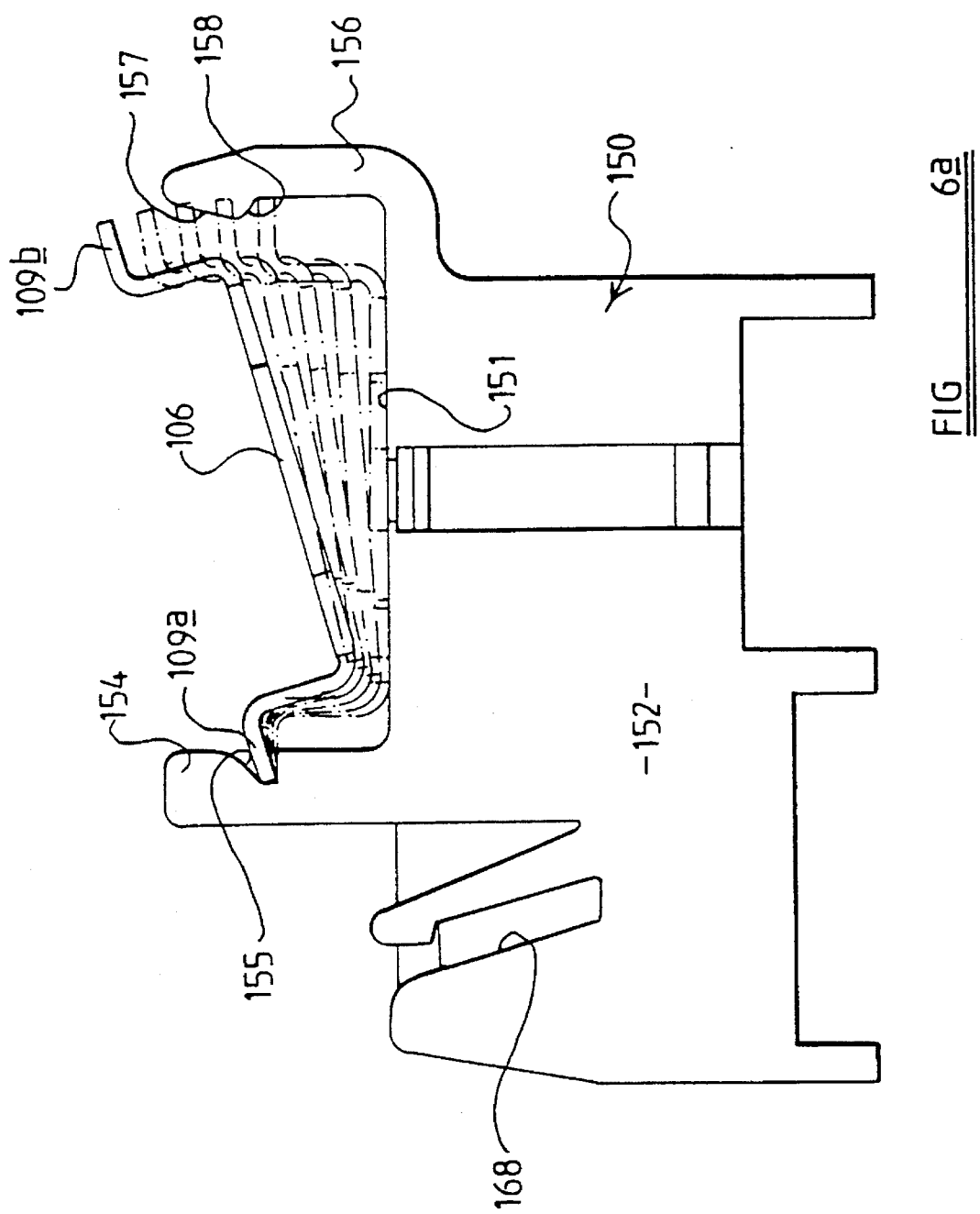

The second embodiment utilises a supporting assembly, shown in detail FIGS. 5 and 6, comprising two end housings 150, each comprising a body 152, and parallel arms 154 and 156 extending upwardly therefrom. The arm 154 is provided with a notch 155, whilst the arm 156 is provided with a cam face 157, extending to a re-entrant section 158.

One flange 109a of the mounting rail 106 may be engaged in the notch 155, and the opposite flange 109b pressed against the arm 156, engaging the cam face 157 and causing the arm 156 to flex outwardly, allowing the flange 109b to pass beneath the re-entrant face 158, with the base 107 of the flange resting against a flat upper surface 151 of the body 152.

As shown in FIG. 5, extending upwardly from said flat surface of the body are projections 160, conveniently of rectangular cross-section, adapted to locate in complementary apertures 162 in the base 107 of the mounting rail.

Additionally the body 152 is provided means, conveniently in the form of an aperture 165, to enable a securing element such as a screw to be passed through a hole 166 in the mounting rail for further securement, such as to a mounting surface.

In this manner the mounting rail 106 may readily be secured in a desired position, for the reception of circuit breakers and ancillary equipment.

Figure 7:
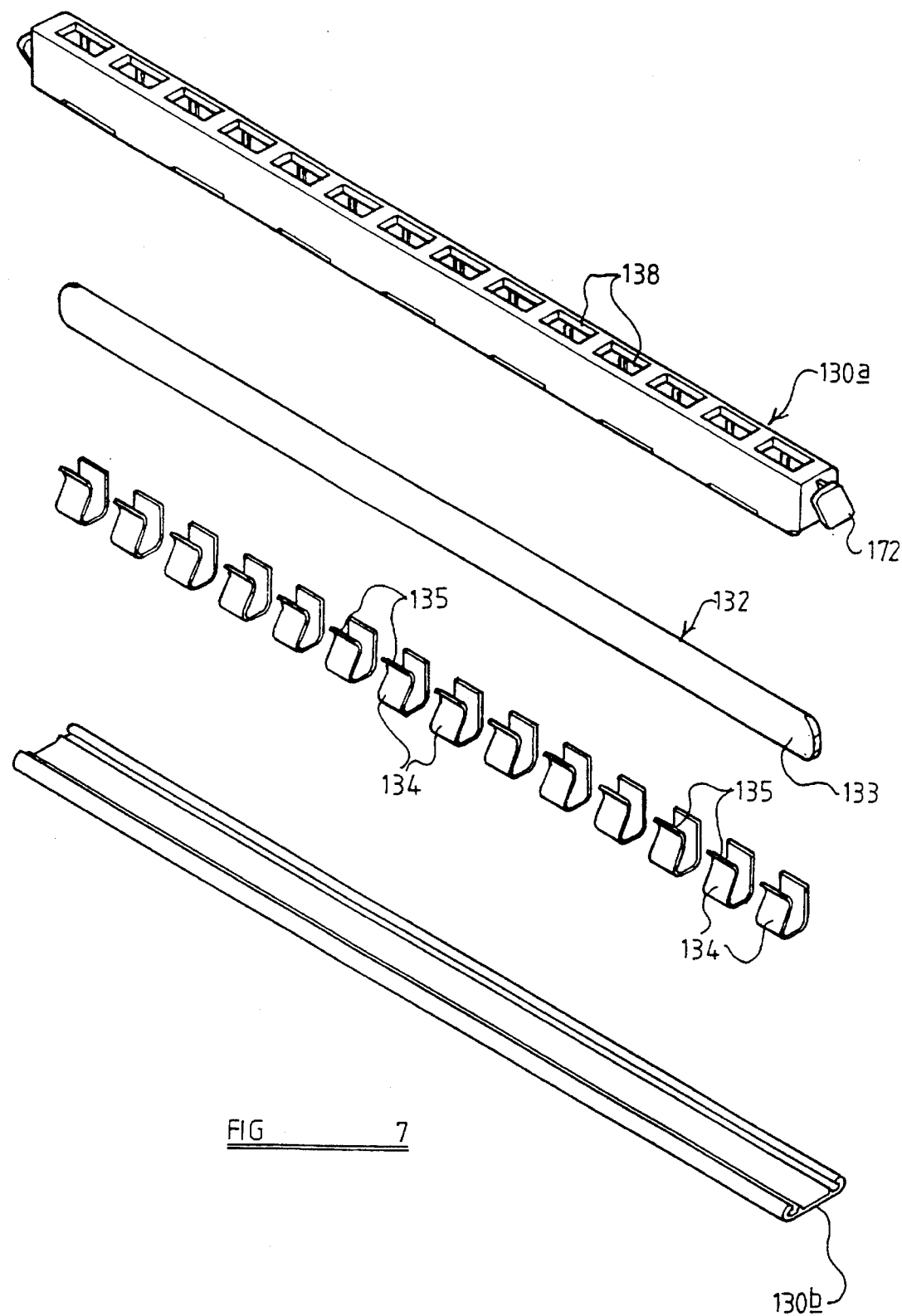
FIG. 7 is an exploded perspective view of a supply assembly of the second embodiment.

The supporting assembly also provides a support for the supply assembly 128, said supply assembly being shown in exploded form in FIG. 7 and comprising an elongate housing 130 comprising an upper housing part 130a, and a lower housing part 130b adapted to be snap-fitted together, an elongate supply member in the form of a bus-bar 132 located in the housing, and a plurality of spring clips 144 of generally U-shape embracing the bus-bar. The bus-bar is provided with generally parallel side faces, and each spring clip 134 is provided with an outwardly-flared terminal portion 135 for the reception of a contact element, as will be described hereinafter.

Each housing is provided with a slot 168, within which a location member 170 of an end cap 172 of the housing 130 may be engaged, firmly to secure the supply assembly to the end housing 150.

In this manner a sub-assembly comprising a mounting rail 106 and supply member 132 may be presented ready for installation, which may be accomplished simply by securing the sub-assembly by the use of screws to a supporting surface, ready for the reception of circuit breakers and ancillary equipment, including equipment to supply power to the bus-bar.

The housing 130 of the supply assembly is provided with upwardly-facing apertures 138 of a spacing equal to the width of a conventional circuit breaker, in turn, being equal to the spacing of the spring clips 134 on the bus-bar 132.

In the use of the sub-assembly, the fixed projection 140 of a circuit breaker is engaged with the flange 109b of the mounting rail, and the circuit breaker is rotated in the direction of the arrow (FIG. 8) until the retractable projection 142 engages against the flange 109a, causing the projection 142 to be withdraw against the action of the spring 143 until said projection passes behind the flange 109a.

As this occurs, the contact member 122 passes through one of the apertures 138, and engages the outwardly-flared margin 135 of an associated spring clip 134, the contact member passing into engagement with the bus-bar 132 and being held there against by said spring clip, with the generally flat faces of the contact member and bus-bar engaging to provide good electrical contact.

On the removal of the circuit breaker from the assembly, the tail 144 may be retracted by the use of tool such as a screw driver to allow the circuit breaker to be rotated in a direction opposite to the direction, withdrawing the contact member 122 from the supply assembly, and this may be accomplished with no danger of inadvertently touching of electrically live parts of the system.

It will be appreciated that whilst the invention has been described above in relation to the mounting of circuit breakers on mounting rails into electrical contact with a bus-bar, in general it will be desirable to use the same construction in relation to the mounting of other items of electrical equipment including main switches, transformers, RCDs, etc. Thus, where these need to be connected to the bus-bar, they will be provided with contact members similar to the contact members 22 of the circuit breakers above described, enabling them to be mounted on the mounting rail 6, and brought into contact with the bus-bar 32 as hereinbefore described.

Figure 3:
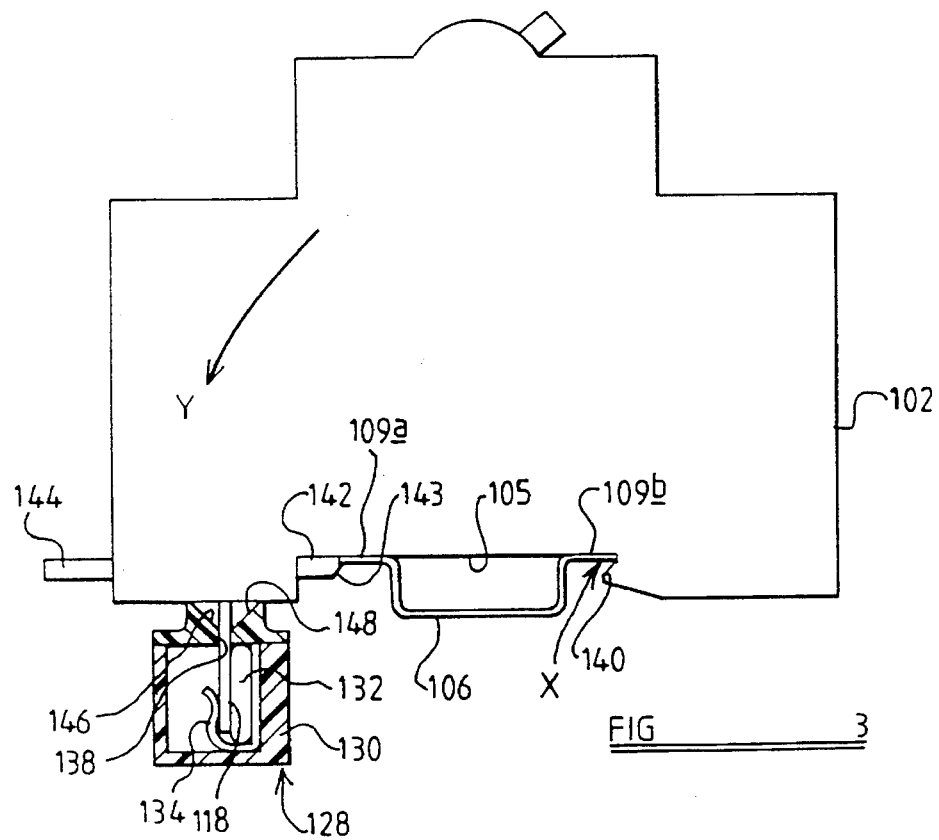
FIG. 3 is a schematic sectional view of an alternative construction of a circuit breaker and supply assembly in accordance with a second embodiment of the invention.

Moreover, by virtue of the supply assembly being located to one side, and below the mounting rail 6 (as shown in FIGS. 2 and 3) other electrical components, which may include time switches, time clocks, transformers and the like, but which do not need to be connected to the bus-bar, may be mounted on the mounting rail 6 in a conventional manner, without any interference from the supply assembly. Such ancillary equipment may conveniently enter into engagement with the upper surface of the housing 130a, as would be the case if a conventional circuit breaker, not having a downwardly-extending contact member 22, were mounted on the mounting rail.

The features disclosed in the foregoing description, or the following claims, or the accompanying drawings, expressed in their specific forms or in the terms or means for performing the desired function, or a method or process for attaining the disclosed result, may, separately or in any combination of such features, be utilised for realising the invention in diverse forms thereof.

We claim:

1. An electricity supply assembly comprising:
   a) an elongate housing of insulating material secured to and extending between two end support members;
   b) an elongate supply member mounted in said housing, said supply member providing a contact face, said housing being provided with at least one narrow slot for access to said supply member;
   c) an elongate mounting rail secured to and extending between said end support members, said mounting rail providing spaced mounting surfaces on which a circuit breaker is positioned, said circuit breaker having flat parallel sides which extend transversely of said mounting rail; wherein
      i) said circuit breaker is provided in an underside thereof with a mounting recess receiving said mounting rail;
      ii) said circuit breaker comprises a contact member projecting through an aperture in the underside of said circuit breaker to one side of said recess and through said slot into said housing;
      iii) said contact member has a contact surface which lies in a plane extending transversely to the parallel sides of said circuit breaker; and
      iv) resilient means is provided in said housing for urging said contact member transversely thereof so that said contact surface of said contact member is in face-to-face engagement with said contact face of said supply member.

2. The system of claim 1 wherein said resilient means includes a spring member.

3. The system of claim 1 or 2 wherein said circuit breaker is provided with a first formation on a side thereof opposite to said contact member and a second formation on the same side of said circuit breaker as said contact member, spring means being provided for resiliently urging said second formation to engage beneath said mounting rail.

4. The system of claim 1 or 2 wherein said housing has spaced apertures receiving respective contact members of a plurality of circuit breakers, a plurality of spaced spring clips in said housing urging the respective contact members into engagement with said contact face of said supply member.

5. The system of claim 1 or 2 wherein said housing comprises a plurality of spring clips at spaced locations such that at least one spring clip is available to engage said contact member as it is moved towards said supply member.

6. The system of claim 1 or 2 wherein said mounting rail is provided with outwardly turned lips, each of said end support members comprising an engagement surface against which an underside of said mounting rail is engaged, each of said end support members including spaced arms extending from said engagement surface and comprising location means within which one of the outwardly-turned lips of said mounting rail is snap-fitted into position against said engagement surface and between said arms.

7. The system of claim 6 wherein the engagement surfaces of the support members are engaged with complementary formations on the underside of said mounting rail, and the support members are provided with means supporting said housing in parallel relationship with said mounting rail.

8. The system of claim 3 wherein said housing comprises apertures provided at spaced intervals receiving contact members of a plurality of circuit breakers.

9. The system of claim 8 wherein said housing comprises a plurality of spring clips at spaced locations such that at least one spring clip is available to engage said contact member as it is moved towards said supply member.

10. The system of claim 9 wherein said mounting rail is provided with outwardly turned lips, each of said end support members comprising an engagement surface against which an underside of said mounting rail is engaged, each of said end support members including spaced arms extending from said engagement surface and comprising location means within which one of the outwardly-turned lips of said mounting rail is snap-fitted into position against said engagement surface and between said arms.

11. The system of claim 10 wherein the engagement surfaces of the support members are provided with formations which are engaged with complementary formations on the underside of said mounting rail, and the end support members are provided with means for supporting the housing in parallel relationship with said mounting rail.

12. The system of claim 1 wherein said housing has spaced apertures receiving respective contact members of a plurality of circuit breakers, a plurality of spaced spring clips in said housing urging the respective contact members into engagement with said contact face of said supply member, said supply member being the only such supply member disposed in said housing.

* * * * *